(No Model.)

D. E. TEAL.
HAND TRUCK.

No. 351,346. Patented Oct. 19, 1886.

WITNESSES:
A. F. Walz,
C. Bendixon.

INVENTOR:
Daniel E. Teal
BY
Duell, Laass & Hey
ATTORNEYS.

UNITED STATES PATENT OFFICE.

DANIEL E. TEAL, OF ONEIDA CASTLE, ASSIGNOR OF ONE-HALF TO FRANK J. AUBEUF, OF ONEIDA, NEW YORK.

HAND-TRUCK.

SPECIFICATION forming part of Letters Patent No. 351,346, dated October 19, 1886.

Application filed August 12, 1886. Serial No. 210,671. (No model.)

*To all whom it may concern:*

Be it known that I, DANIEL E. TEAL, of Oneida Castle, in the county of Oneida, in the State of New York, have invented new and useful Improvements in Hand-Trucks, of which the following, taken in connection with the accompanying drawings, is a full, clear, and exact description.

This invention relates to a hand truck or cart designed chiefly for transporting vegetables, grain, and analogous articles in measured quantities, and in a compact and convenient manner, from the field where gathered, or from the grocery to the place where they are ordered; and the invention consists in the novel construction and combination of parts, as hereinafter described, and specifically set forth in the claims.

Figure 1:
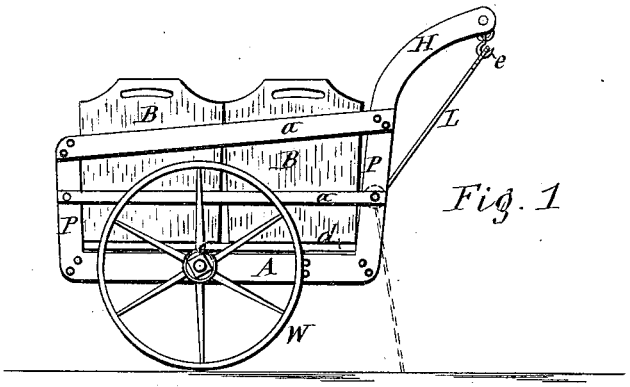
Figure 2:
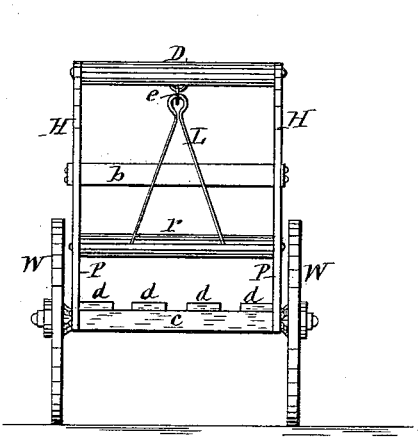
Figure 3:
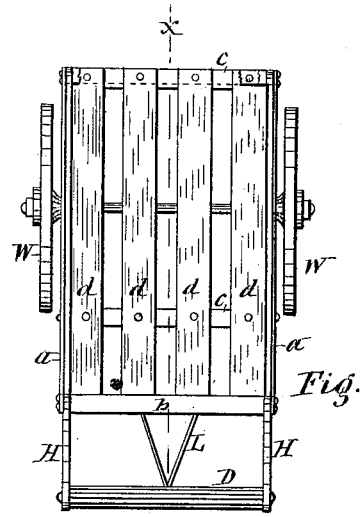

In the accompanying drawings, Figure 1 is a side elevation of my invention. Fig. 2 is a rear end view of the same. Fig. 3 is a plan view with a portion of the frame broken away to show the attachment of the bottom slats; and Fig. 4 is a vertical longitudinal section on line $x\ x$, Fig. 3.

Similar letters of reference indicate corresponding parts in all the figures.

W W represent the two carrying-wheels of the truck or cart, which wheels are journaled on an axle secured to the frame or body, slightly forward from the center thereof, so as to cause the hind end of the truck or cart to overbalance the front end thereof. The frame or body of the said truck is of a square or rectangular form and constructed as follows: Each side is composed of a sill, A, two corner-posts, P P, and a rearwardly-extended arm, H, all formed of a continuous bar of steel or iron, and longitudinal rails $a\ a$ are riveted to the sides of the posts P P. The described sides of the frame or body are connected with each other by cross-rails $b\ b$, secured to the aforesaid corner-posts, and by cross-sills $c\ c$, secured to the side sills, A A. The bottom of the frame or body consists of slats $d\ d$, secured to the top of the cross-sills. Between the free ends of the two arms, and firmly secured thereto, is a cross-bar, D, which serves as the handle for the truck, and between the rear posts, P P, and pivoted thereto, is a roller, $r$, to which is attached a leg, L, formed of a rod bent V-shaped, and secured at its divergent ends to the aforesaid roller. The leg is adapted to rest at a point intermediate its length against the rear end of the bottom of the truck-frame, when said leg is swung into a position to support the rear end of the truck, as represented by dotted lines in Figs. 1 and 4 of the drawings.

Figure 4:
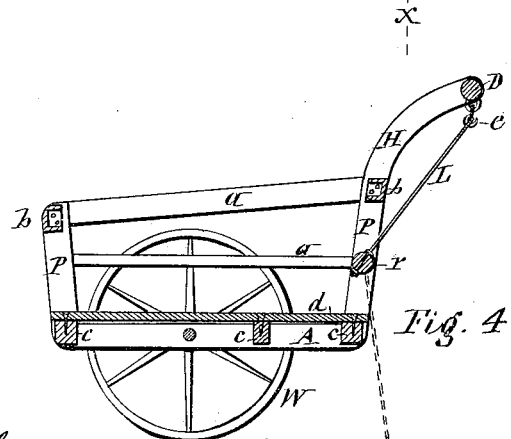

To the handle H is connected a hook or other suitable catch, $e$, adapted to engage and hold the leg in its elevated position, as shown in full lines in Figs. 1 and 4 of the drawings, in which position the said leg is placed while the truck is run on its wheels.

B B represent boxes or receptacles for the substance to be transported by the truck. These receptacles are square or rectangular in form, similar to but of smaller proportion than the interior of the frame or body of the truck, in which said receptacles are removably seated. They are so proportioned that when placed on the truck they compactly fill the frame or body thereof, and form therein compartments which abut against the sides of the truck-frame and against each other, so as to firmly hold them in their position.

Having described my invention, what I claim as new is—

1. In a hand-truck, the side of the frame composed of the sills A, corner-posts P P, and the rearwardly-extended arm H, all formed in one piece of a continuous bar of metal, and longitudinal rails secured to the upper parts of the corner-posts, substantially as described and shown.

2. The combination, with the truck-frame having its two sides each composed of the sill A, corner-posts P P, and rearwardly-extended arm H, formed of a continuous bar of metal, as shown, of the handle D, connecting the free ends of the two arms H H, and the leg L, pivoted to the rear end of the frame to swing vertically thereon, and adapted to rest intermediate its length against the rear end of the bottom of the frame, substantially as specified.

3. The combination, with the truck-frame having its two sides each composed of the sill A, corner-posts P P, and rearwardly-extended arm H, formed of a continuous bar of metal, as shown, of the handle D, connecting the free ends of the two arms H H, the roller r, pivoted at opposite ends to the posts P P, the leg L, attached to said roller, and the catch e, connected to the handle D, substantially as shown and described.

In testimony whereof I have hereunto signed my name and affixed my seal, in the presence of two attesting witnesses, at Syracuse, in the county of Onondaga, in the State of New York, this 15th day of July, 1886.

DANIEL E. TEAL. [L. S.]

Witnesses:
 FREDERICK H. GIBBS,
 C. BENDIXON.